E. W. HOYT.
SELF GRINDING VALVE.
APPLICATION FILED MAY 31, 1910.

981,087.

Patented Jan. 10, 1911.

Witnesses

Inventor
E. W. Hoyt,
By
Attorneys

UNITED STATES PATENT OFFICE.

EUGENE W. HOYT, OF DECORAH, IOWA.

SELF-GRINDING VALVE.

981,087. Specification of Letters Patent. Patented Jan. 10, 1911.

Application filed May 31, 1910. Serial No. 564,155.

*To all whom it may concern:*

Be it known that I, EUGENE W. HOYT, citizen of the United States, residing at Decorah, in the county of Winneshiek and State of Iowa, have invented new and useful Improvements in Self-Grinding Valves, of which the following is a specification.

My invention pertains to reciprocating valves of the self-grinding type; and it has for its object to provide a simple and durable construction in which the spring for yieldingly pressing the valve body against its seat is inclosed in the body and stem and the collar which effects connection of the body to the stem, and is enabled to press the body against the seat notwithstanding the fact that the body is turned whenever the stem is turned.

Figure 1:
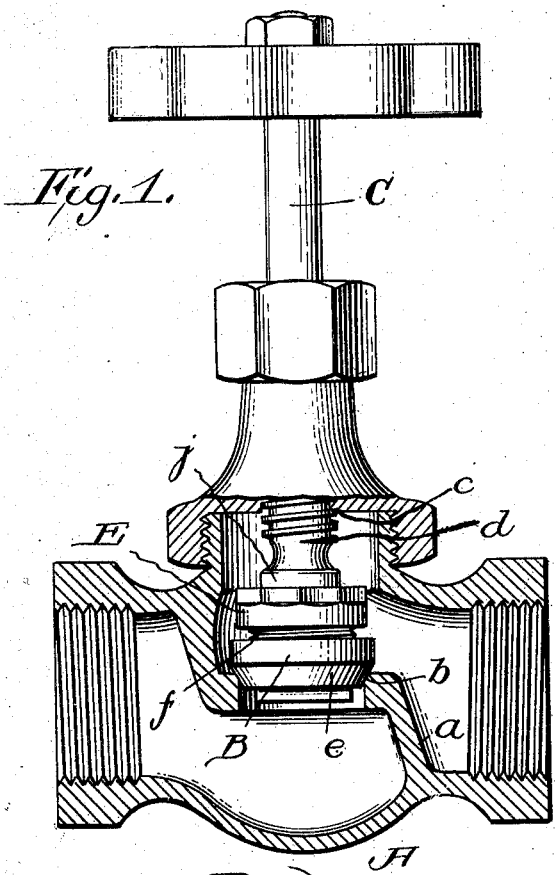
Figure 2:
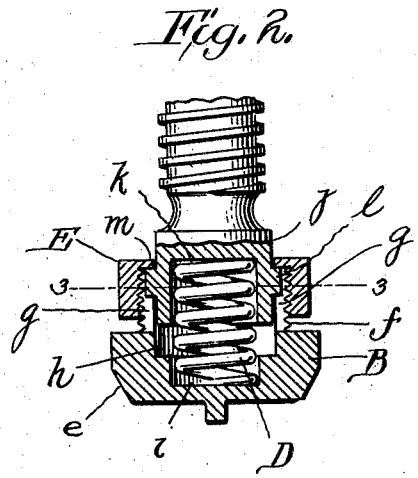
Figure 3:
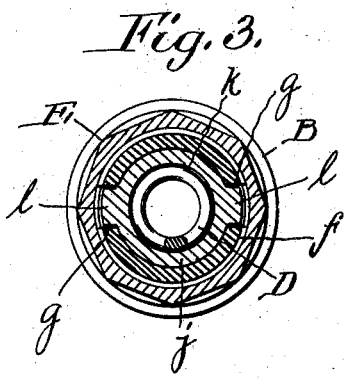
Figure 4:
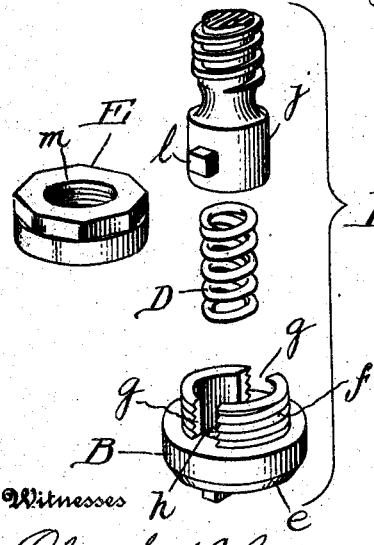
Figure 5:
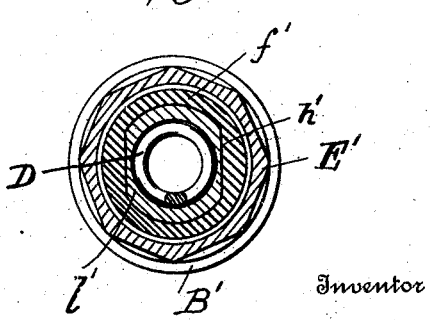

With the foregoing in mind the invention will be fully understood from the following description and claims when the same are read in connection with the drawings, accompanying and forming part of this specification, in which:

Figure 1 is a view, partly in section and partly in elevation, of a self-grinding valve constructed in accordance with my present invention. Fig. 2 is a vertical, diametrical section taken through the valve body and the parts adjacent thereto. Fig. 3 is a horizontal section taken in the plane of the line 3—3 of Fig. 2. Fig. 4 comprises disconnected perspective views of the valve-body, the portion of the stem adjacent thereto, the spring and the collar for connecting the body to the stem so as to assure the same always turning together. Fig. 5 is a horizontal section taken through the flanged body of the flange, the stem, the spring and the connecting collar, and illustrating a modification hereinafter specifically referred to.

Similar letters of reference designate corresponding parts in all of the views of the drawings.

The valve casing A is provided in its partition $a$ with an interior circular seat $b$ adapted to receive the lower portion of the valve body B, and is also provided with an interior thread $c$ for the engagement of the thread $d$ on the valve stem C; the said thread $c$ being preferably formed in the bonnet of the casing, as shown.

The valve body B is provided with a lower tapered portion $e$, adapted to enter the seat $b$, and is also provided with an upstanding and exteriorly threaded flange $f$ in which are diametrically opposite notches $g$. Interiorly the said valve body B is provided with a socket $h$ which corresponds in diameter to the inner side of the flange $f$ and is adapted to snugly receive the lower end of the stem C; the said socket $h$ communicating with a smaller socket $i$ which depends from the bottom thereof and is adapted to snugly seat the lower end of the coiled spring D with a view of holding the same against lateral deflection.

The stem C is provided at its inner or lower end with a slightly enlarged portion $j$, of circular form in cross-section, having a socket $k$ to receive the upper portion of the spring D and also having diametrically opposite lateral projections $l$ designed to rest in the notches $g$ of the valve body B; the said projections $l$ being shallower than the notches as shown in order to permit of vertical movement of the body B on the stem C notwithstanding when the stem is turned the body must turn therewith.

The collar E for effecting connection of the body B to the stem C is interiorly threaded to engage the exterior thread on the flange of said body, and is provided at its upper end with an inturned flange $m$ designed to bear on the projections $l$ of the stem and move upward therefrom and downward thereto.

In the practical use of the valve constructed in accordance with my present invention it will be understood that the valve body B and the collar E will turn at all times with the stem C when said stem is turned either downward or upward in the casing. It will also be understood that incidental to the closing of the valve, the valve body B will first bring up against the seat $b$, and then as the downward turn of the stem C is continued, the stem C will move downward with respect to the body B and the collar E, and in consequence the spring D will be compressed. From this it follows that when the stem C is turned to open the valve, the spring D will serve during the latter part of said turning to yieldingly press the valve body against the seat $b$ and assure thorough grinding of the opposed portions of the seat and valve body. It will further be understood from the foregoing that the snug arrangement of the spring in the socket at the lower end of the stem and in the small socket in the valve body will tend to prevent lateral deflection and deterioration of the spring and will enable it to efficiently exert pressure in the direction of its length only, as will also the fact that the valve body B while free to move vertically with respect to the stem, is effectually prevented from turning about the stem. This latter also serves to prevent the imposition of torsional strain on the spring and in that way tends to prolong the efficiency of the same. The imposition of torsional strain on the spring D is also prevented by reason of the valve seat $b$ being an interior valve seat which snugly receives the valve body B during the completion of the closing and the commencement of the opening of the valve.

In the modified construction shown in Fig. 5 the valve body B' is provided with an exteriorly threaded flange $f'$, and inside the said flange and the upper portion of the body is a socket $h'$ designed to receive the lower angular portion $l'$ of the valve stem. In this construction the collar E' is connected to the flange $f'$ in the manner before described and is provided with an inturned flange designed to bear on the upper end of the lower enlarged portion of the stem. Thus it will be seen that notches and lugs are dispensed with, and yet the stem is enabled to strongly transmit rotary motion to the body B without interfering with the vertical movement of the spring-pressed body and the collar connected therewith on the stem.

Having described my invention, what I claim and desire to secure by Letters-Patent, is:

1. A valve comprising a casing provided with an interior circular seat and with an interior thread, a stem threaded to engage said interior thread and having a lower enlarged portion of circular form in cross-section and also having a socket in the lower end of said enlarged portion and diametrically opposite projections on the outside thereof, a body having a lower tapered portion adapted to enter the said interior circular seat and also having an upstanding exteriorly threaded flange in which are diametrically opposite notches, of a greater depth than the said projections of the stem, and further having a socket corresponding in diameter to the inside of the flange and a smaller socket depending from the bottom of said socket, a coiled spring snugly arranged in the socket of the stem and the said small socket of the body, and an interiorly threaded collar engaging the threaded flange of the body and having an inturned flange which snugly receives the lower enlarged portion of the stem and is movable upward away from and downward to the said projections of the stem.

2. A valve comprising a casing provided with an interior seat and with an interior thread, a stem threaded to engage said interior thread and having a socket in its lower end and also having an exterior lower portion of non-circular form in cross-section, a body movable toward and from said interior seat and having an upstanding exteriorly threaded flange, and a socket alined with that in the stem, and further having an interior non-circular portion receiving the said non-circular portion of the stem, whereby the body is adapted to turn with and move up and down on the stem, a coiled spring arranged in the sockets of the stem and body, and an interiorly threaded collar engaging the threaded flange of the body and movable with said body up and down on the stem and having an inturned flange supported on the stem.

In testimony whereof I have hereunto set my hand in presence of two subscribing witnesses.

EUGENE W. HOYT.

Witnesses:
B. W. Olson,
R. Algyer.